United States Patent [19]

Catanzarite

[11] 4,127,702

[45] Nov. 28, 1978

[54] SELF-VENTING BATTERY

[76] Inventor: Vincent O. Catanzarite, 356 Desert Inn Rd., Las Vegas, Nev. 89109

[21] Appl. No.: 840,520

[22] Filed: Oct. 11, 1977

[51] Int. Cl.$^2$ ............................................. H01M 2/12
[52] U.S. Cl. ...................................... 429/56; 429/181
[58] Field of Search .................. 429/56, 174, 184, 181

[56] References Cited

U.S. PATENT DOCUMENTS

| 3,005,865 | 10/1961 | Jonsson | 429/184 |
| 3,064,065 | 11/1962 | Belove | 429/56 |
| 4,047,292 | 9/1977 | Shaffer | 429/174 |

Primary Examiner—Donald L. Walton
Attorney, Agent, or Firm—Flehr, Hohbach, Test, Albritton & Herbert

[57] ABSTRACT

A self-venting battery is disclosed herein and includes a casing, two terminals and an assembly of components located within the casing for producing a voltage across the terminals. An insulator is provided between and bonded to these terminals for electrically insulating them from one another. This insulator is constructed such that increasing pressure within the casing will cause the insulator to crack a sufficient amount to vent the pressure in the casing before causing the bond between the insulator and terminals to fail.

17 Claims, 4 Drawing Figures

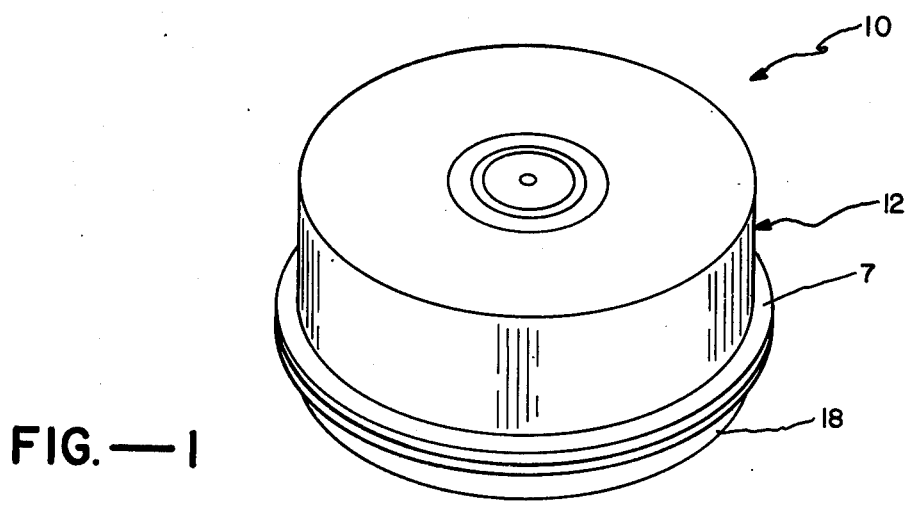
FIG.—1
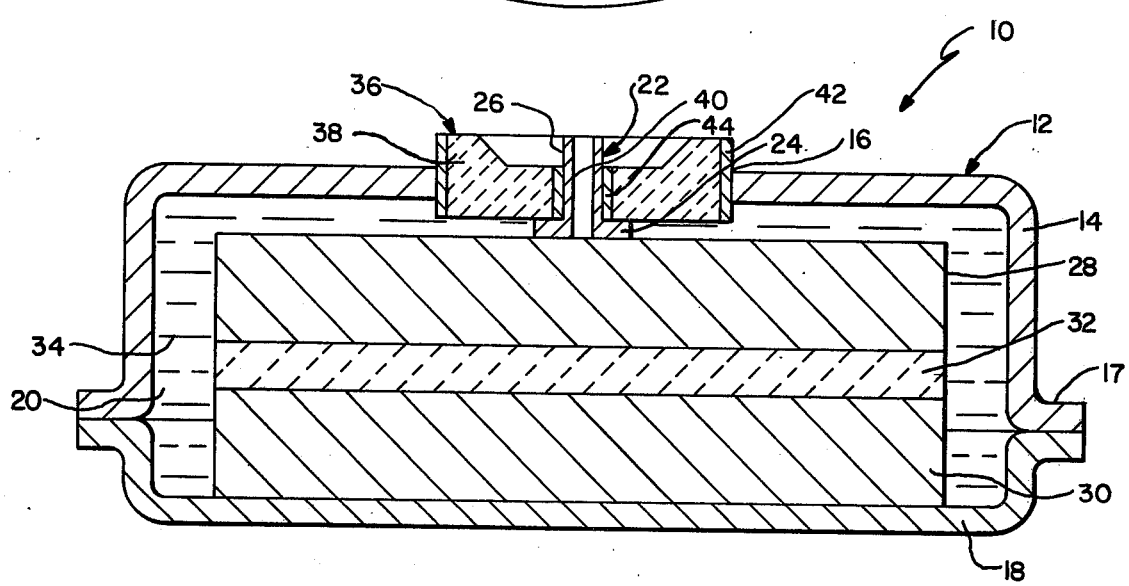
FIG.—2
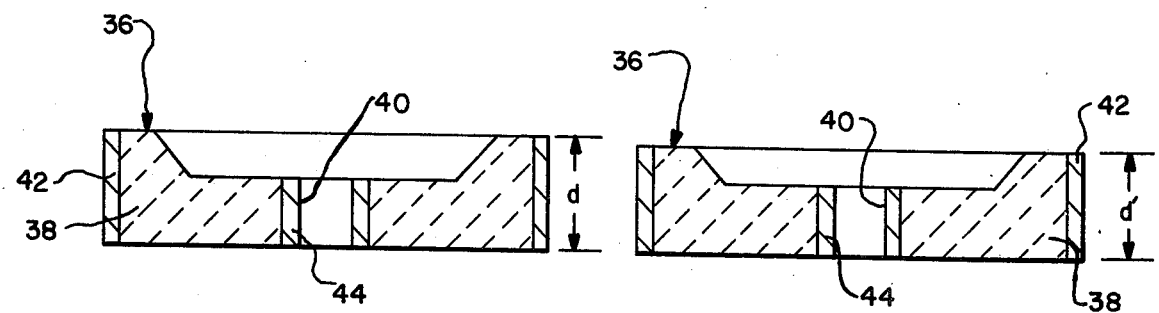
FIG—3A    FIG.—3B

SELF-VENTING BATTERY

BACKGROUND OF THE INVENTION

The present invention relates generally to batteries and more particularly to a hermetically sealed battery which is self-venting when its interior rises in pressure above a predetermined level.

Most heremetically sealed batteries which are presently available, particularly the smaller ones such as the button batteries, are not self-venting. Accordingly, if this type of battery is exposed to elevated temperatures, the resulting buildup in pressure within could cause it to explode.

In order to obviate a situation of the type just described, a separate mechanical venting arrangement could be provided. However, this would be relatively expensive, especially compared to the overall cost of the battery.

As will be seen hereinafter, the present invention provides a way to self-vent batteries in an uncomplicated and economical but reliable way. Moreover, the self-venting batery of the present invention requires no more components than non-venting batteries.

OBJECTS AND SUMMARY OF THE INVENTION

One object of the present invention is to provide a battery which is self-venting at relatively high internal pressures.

Another object of the present invention is to provide a battery which is self-venting and yet which is uncomplicated in design, economical to produce and reliable in use.

Still another object of the present invention is to provide a battery which is self-venting at relatively high pressures but which requires no additional components over and above those required by non-venting batteries.

A further object of the present invention is to provide a battery which utilizes an insulating ring between its terminals but which is not susceptible to the explosion problem discussed above in response to excessive internal pressures.

A battery which is constructed in accordance with the present invention and which carries out the objects, as recited, is disclosed herein. This battery includes a casing having an inner compartment, means defining a first external terminal and a second external terminal space from the first terminal. An insulator is located between and bonded to both of these terminals for electrically insulating them from one another. The battery casing, both terminal defining means and the insulator together maintain the compartment within the casing in a fluid seal state so long as the pressure within the compartment is below predetermined value. The battery of course includes the necessary means within the casing compartment and cooperating with both the first and second terminal defining means for producing a voltage across the terminals.

In accordance with the present invention, the insulator located between and bonded to the terminals is constructed such that increasing pressure within the casing compartment will cause the insulator to crack a sufficient amount to vent the pressure before causing failure of the bond at the terminals. Therefore, should there be an excess buildup in internal pressure, the battery will not explode in the manner described previously. Rather, the insulator will crack in an uncompli- cated, safe and reliable manner for venting the internal pressure.

BRIEF DESCRIPTION OF THE DRAWING

FIG. 1 is a perspective view of a battery, particularly a button battery, which is constructed in accordance with the present invention.

FIG. 2 is a cross-sectional view of the battery illustrated in FIG. 1.

FIGS. 3a and 3b are cross-sectional views of a particular component comprising the battery of FIGS. 1 and 2, illustrating certain dimensional aspects of this component.

DETAILED DESCRIPTION OF PREFERRED EMBODIMENTS

Turning now to the drawing, wherein like components are designated by like referenced numerals in the figures, a battery constructed in accordance with the present invention is illustrated and generally designated by the referenced numeral 10. While the battery illustrated is a button battery, as will become apparent hereinafter, all batteries including the larger sized batteries may incorporate the various features of the present invention.

Turning specifically to FIG. 1, battery 10 is shown to include a casing 12 which may be constructed of any suitable material but which in a preferred embodiment is constructed of metal, specifically stainless steel. As will be seen hereinafter, this metal casing acts as one terminal of the battery. Casing 12 includes a top cover 14 having a central opening 16 (see FIG. 2) extending through its top end and an outwardly flared circumferential flange 17 located at and around its bottom end. The casing also includes a bottom cover 18 and corresponding flange 19 which is welded or otherwise suitably fastened to the top cover around the underside of flange 17. As seen in FIG. 2, these two covers together define an internal battery chamber or compartment 20 which, as will be seen, is hermetically sealed so long as the pressure within the compartment is below a predetermined level.

It should be quite obvious that the cross-sectional thickness of casing 12 can be of any resonable value. However, it should be equally obvious that for purposes of economy it is desirable to provide as thin a casing as possible. In three actual working embodiments of the present invention, as will be seen hereinafter, batteries were provided having stainless steel casings which were 0.010 inch thick (the smallest battery), 0.020 inch thick and 0.030 inch thick (the largest battery), respectively.

As stated above, casing 12 acts as one terminal of battery 10. The battery of course includes a second terminal which is generally indicated at 22. This second terminal is constructed of any suitable metal material, for example, stainless steel, and is elongated in shape, actually for reasons to be discussed hereinafter, it is tubular in a preferred embodiment. This terminal extends through opening 16 and is spaced from top cover 14 of casing 12 such that one said end section of the terminal, indicated at 24, is positioned within chamber 20 and such that an opposite end section, indicated at 26, is positioned outside the casing. In actuality, it is this opposite end section 26 which acts as the second terminal of the battery.

The inner end section 24 of terminal 22 includes an outwardly flanged end connected to the battery's anode 28 which, as seen in FIG. 2, is located within chamber 20. The anode is constructed of any suitable material, for example lithium, and is spaced from and confronts a cathode collector 30 which may also be constructed of a suitable material, for example carbon. A suitable electrically non-conductive spacer 32, for example a glass or ceramic disc, is located between anode 28 and cathode collector 30 for maintaining the two separate from one another. The anode, cathode collector and spacer just described comprise part of the inner workings of battery 10. In order to complete the inner workings, a conventional electrolytic solution, generally designated at 34 is provided within and fills chamber 20 and thus is in direct contact with anode 28, cathode collector 30 and the inner surface of casing 12. In an actual working embodiment, this solution which at least in part acts as a liquid cathode is a lithium aluminum tetrachloride dissolved in thionyl chloride. In an actual working embodiment, it is placed in chamber 20 through the tubular terminal 22 which is thereafter crimped closed.

The electrolytic solution just described together with anode 28 which is spaced from casing 12 and cathode collector 30, which is in electrical contact with casing 12, produce a voltage across the terminals of battery 10. It should be quite obvious that terminal 22 acts as the anode terminal of the battery and that casing 12 acts as the cathode terminal, where the inner workings have been described for examplary purposes only. Any conventional means for producing an appropriate voltage across the battery terminals may be readily provided by one with ordinary skill in the art and such conventional means would not directly effect the present invention.

As stated previously, terminal 22 is located within opening 16 in top cover 14 of casing 12. In order to insulate this terminal from the casing, battery 10 includes a circumferential insulation member 36 which has an outer circumferential surface 38 and an inner circumferential surface 40. As illustrated in FIG. 2, this insulation member is located within and fills opening 16 in top cover 14, concentrically around terminal member 22, thereby electrically insulating the terminal member 22 from casing 12. The outer surface 38 is bonded in a continuous fashion to the top cover 14 around opening 16 and inner surface 40 is bonded in a continuous fashion to and around the outer surface of terminal 22. The specific way in which the insulating member is bonded to top cover 14 and terminal 22 will, for the most part, depend upon the particular material utilized in constructing the insulation member, as will be discussed below. For the moment, it should suffice to state that casing 12 and terminal 22 together with insulation member 36 maintain chamber 20 in a fluid sealed state, specifically in a hermetically sealed state, so long as the pressure within the chamber is below a predetermined level to be discussed below.

In accordance with the present invention, insulation member 36 is constructed of any electrically nonconductive material which can be bonded to casing 12 and terminal 22 and which meets the following requirements. First, it must have sufficient structural integrity so that it does not crack or otherwise fail at internal pressures within chamber 20 below a predetermined value, specifically about 100 psi. Second, it must be constructed such that increasing pressure within the compartment, that is, pressure exceeding 100 psi, will cause the insultating member to crack a sufficient amount to vent the pressure within the chamber before causing the bond between the insulator and casing 12 or the bond between the insulator and terminal 22 to fail.

The necessity for the first requirement recited above should be quite apparent. It is not uncommon for a battery of the type described or actually any battery to be exposed to a moderately high temperature for a prolonged period of time for example during shipment or shortage thereby resulting in a moderate buildup of internal pressure. Insulator 36 must display sufficient structural integrity to withstand these type of conditions without cracking or otherwise failing or the defect rate of such a battery before actually reaching the consumer could be quite high. The necessity for the second requirement was discussed previously and will also be discussed hereinafter.

The precise level of pressure within chamber 20 before causing failure to insulation member 36 depends upon a number of factors including the thickness of the casing and particularly the material making up the insulation member and its shape. Obviously, if insulation member 36 is constructed to display high structural integrity, this pressure level will be higher than if the insultation displays less structural integrity, of course assuming the casing thickness is the same. However, it should be kept in mind that the insulation member must be structurally weaker than the bond between it and the casing and/or terminal 22, at least to the extent that increasing pressure within chamber 20 will cause the insultation member to crack sufficient to vent the pressure before causing these bonds to fail. Hence the insulation must be constructed to fail somewhere between the relatively low but normal pressures which might buildup within the battery and pressures sufficiently high to cause failure of the bond between the insulation member and casing 12 or between the insulation member and terminal 22.

Should the structural integrity of the insulation member be greater than these bonds, a sufficiently high level of pressure within chamber 20 would cause the insulation member to be propelled from its casing much like a bullet. Should the insulator be too weak, the battery may not be readily marketable as a result of premature venting. Obviously, from a practical standpoint, taking into account such factors as cost and availability of material and compatability, the insulator should be selected to provide a failure point somewhere comfortably between these extremes.

One aspect which should be considered in selecting the particular insulation material to meet the foregoing requirements is the relative brittleness of the insulator compared to the casing. More specifically, if the insulator is less brittle (more resilient) than the casing, the insulator may bend or otherwise deform in response to high internal pressure causing a bond failure before the insulator itself fails. A stainless steel casing using a flexible nylon insulator might be one such example of this.

One particular material which may be utilized to construct insulation member 36 is glass which in general is more brittle than a stainless steel casing. However, it must be remembered that the particular glass composition selected must be such that the insulator meets the requirements set forth above. However, even if the glass insulator does not meet those requirements, it should meet a third requirement, although not absolutely necessary to the present invention. Specifically, the glass insulator should have sufficient structural integrity to resist physical abuse to which it most probably will be exposed between the time the battery is manufactured and the time it is ultimately placed in use.

While the utilization of a glass insulator may meet the various requirements discussed above and may be satisfactory, it does have certain drawbacks. First, the structural characteristics of glass are very difficult to control during its manufacture, thereby making it difficult to provide in a reliable way a glass insulator zhich meets the foregoing requirements. Moreover, the glass-to-metal bond between the insulator and both the casing and terminal 22 may vary widely and, in any event, is difficult to control.

A non-glass material which is resistant to physical abuse and which does not have the drawbacks just mentioned, as well as meeting the requirements referred to above, is a conventional ceramic material including alumina ($Al_2O_3$) as its main ingredient. This material, which is also more brittle than a stainless steel casing, can be readily manufactured in a controlled fashion to include the desired structural attributes and, as will be seen, it can be bonded in a controlled fashion. In a preferred and actual working embodiment of the present invention, battery 10 includes such a ceramic insulator, specifically one including Alumina as its main ingredient. A commercially available insulator of the type is an AD 94 ceramic insulator made available by Coors Corporation in the shape illustrated in FIG. 2. However, it is to be understood that the present invention is not limited to this particular ceramic material and in fact, as stated above, it is not limited to ceramic material at all. In any event, based on the teachings of the present invention, the particular material selected to meet the requirements it must, as described above, could be readily provided by those with ordinary skill in the art.

Where the insulation member is indeed ceramic material or for that matter any other material which is incompatible with metal from a bonding standpoint, suitable means may be necessary to make the two compatible. For example, where insulator 36 is constructed of a ceramic material, it may include a metalized coating on its exterior surface 38, as indicated at 42, and a metalized coating on its inner surface 40, as indicated at 44. This may be accomplished in any conventional manner including for example the well known Moly-Maganese method of metalizing where ultimately a molybdenum coating results. Once such a coating is provided the insulator can be brazed to top cover 14 of casing 12 and terminal 22. In this regard, it is to be understood that the present invention is not limited to this particular method of bonding where other compatible methods might be just as satifactory. For example, where an economical cement is available and will provide a satisfactory bond between the insulator material and both the top cover 14 and terminal 22, it may be practical to use it rather than the metalizing approach.

Having described battery 10, attention is now directed to a number of sample batteries which were tested under high temperature conditions. In all of these batteries, the inner workings were identical, that is, all of the sample batteries utilized a lithium anode, a carbon cathode collector and a ceramic plate separating the two. Moreover, all of these samples included aluminum tetrachloride dissolved in thionyl chloride as its cathodic electrolyte. With the exception of size and thickness, the battery casings were identical, specifically stainless steel. Moreover, each sample utilized an identical cathode terminal, specifically terminal 22 in FIG. 2, and, with the exception of thickness, the insulators utilized to insulate their respective terminals from their respective casings were identical, specifically the Coors' AD94 ceramic insulators referred to above.

In one group of sample batteries, one battery had a casing which was 0.80 inch in diameter and 0.01 inch thick, a second battery in this group had a casing which was 0.88 inch in diameter and 0.22 inch thick and a third battery had a casing which was 1.25 inches in diameter and 0.03 inch thick. All of the batteries in this group utilized a ceramic insulator which was 0.05 inch thick at its axially thickest point, as indicated by the dimension D in FIG. 3a.

A second group was provided and consisted of batteries which were respectively identical to the two smaller batteries in the group just recited with one exception. The battery with a 0.010 inch casing included a ceramic insulator having an axial thickness (at its axially thickest point) reduced to 0.025 inch, as indicated by the dimension $D^1$ in FIG. 3b. In a similar manner, the corresponding battery having a 0.020 inch casing utilized a ceramic insulator having a reduced axial dimension $D^1$ of 0.040 inch. In all cases, including those in the first group the insulators were metalized as described above.

All of the sample batteries just described were placed on a hot plate (bottom sides down) which was maintained at a temperature of approximately 500° C. This of course resulted in a buildup in internal pressure within the batteries. In the case of the first group, the two smaller batteries, that is, the battery having a 0.01 inch thick casing and the battery having a 0.02 inch thick casing each failed at the bond between the ceramic insulator and casing/terminal causing the insulator to blow out. The battery including a 0.030 inch casing with its 0.050 inch insulator failed at the insulator, that is, the insulator cracked, thereby venting out the internal pressure before the bond itself could fail. In the second group, the battery sample including a 0.010 inch casing and 0.030 inch insulator and the battery including a 0.010 inch casing and 0.040 inch insulator each failed at the insulator, that is, the insulator actually cracked and vented the pressure within before blowout could occur.

In another example, a battery was evaluated to determine the approximate pressure necessary to cause a bonding failure and blowout so that the insulator could be readily designed to prevent this. In this particular experiment, a battery identical to the one including a 0.020 inch thick housing and a 0.050 inch thick ceramic insulator was utilized. In this particular experiment, pressure from an external source was injected into the battery chamber until the insulator blew out. Based on 50 actual trials it was determined that a pressure of between approximately 1500 and 2500 psi was required to blow out the insulator, that is, cause failure to the bond between the insulator and the casing/terminal. Obviously this range would be somewhat less for a battery having a 0.010 inch casing and 0.050 inch insulator of the type described above. In any event, this information is not intended to limit the present invention but rather to provide some guidance for designing the ceramic insulator to fail below this approximate pressure range. Of course ths insulator must be designed to fail below the minimum pressure level described previously.

It is to be understood that the aforedescribed experiments have been provided for examplery purposes only and are not intended to limit the present invention. Moreover, it is to be understood that the present invention is not exclusively limited to the particular button type battery described above or, for that matter to button type batteries in general. Rather, the present invention may be incorporated into any type of battery which requires an insulator between its anode and cathode and which is capable of developing excessive internal pressures. Moreover, it is to be understood that the particular insulator selected is not limited to the specific ceramic insulator described, so long as it meets the requirements set forth above.

What is claimed is:

1. A battery comprising:
   (a) a casing defining an inner compartment;
   (b) means for defining a first external terminal;
   (c) means for defining a second terminal;
   (d) means located between and bonded to said first and second terminals for electrically insulating the two from one another;
   (e) said casing, first and second terminal defining means and insulating means together maintaining said compartment in a fluid sealed state so long as the pressure within said compartment is below 100 psi;
   (f) means located within said compartment and cooperating with said first and second terminal defining means for producing a voltage across said terminals; and
   (g) means for automatically venting said inner compartment to a location outside said compartment in the event the pressure therein increases to a level above 100 psi, said venting means consisting essentially of said insulating means, said insulting means being constructed such that increasing pressure within said compartment, above said 100 psi, will cause said insulating means to crack a sufficient amount to vent said pressure before causing the bond between said insulating means and said terminals to fail.

2. A battery according to claim 1 wherein said insulating means is constructed of a ceramic material.

3. A battery according to claim 2 wherein said casing is metal and wherein said means defining said first terminal includes said casing.

4. A battery according to claim 1 wherein said insulating means is constructed of a material more brittle than said casing.

5. A battery according to claim 4 wherein said material is glass material.

6. A battery according to claim 4 wherein said material is ceramic material.

7. A battery comprising:
   (a) a casing which defines an internal compartment;
   (b) first metal means for providing one terminal of the battery;
   (c) second metal means for providing a second terminal of said battery;
   (d) ceramic means located between and bonded to said first and second terminals for electrically insulating the two from one another;
   (e) said casing, both of said metal means and said ceramic means together maintaining said compartment in a fluid sealed state so long as the pressure within said compartment is below a predetermined level;
   (f) means located within said compartment and cooperating with both of said metal means for producing a voltage across said terminals; and
   (g) means for automatically venting said internal compartment to a location outside said compartment in the event the pressure therein increases above said predetermined level, said venting means consisting essentially of said ceramic means, said ceramic means being constructed such that increasing pressure within said compartment will cause said ceramic means to crack a sufficient amount to vent said pressure before causing the bond between said ceramic means and said terminals to fail.

8. A battery according to claim 7 wherein said means for providing said one terminal includes the outer surface of said casing and wherein said means for producing a voltage across said terminals includes:
   (i) a solid anode located within said compartment and spaced from said casing, said anode being connected with said metal means defining said second terminal;
   (ii) a solid cathode collector located within said compartment and spaced from said anode and electrically connected to said casing;
   (iii) means for electrically insulating said anode and cathode collector from one another; and
   (iv) a liquid cathode located within and filling said compartment, said liquid cathode being in direct contact with said anode, collector and the inner surface of said casing.

9. A battery according to claim 7 wherein said casing is metal and wherein said metal means providing said one terminal includes the outer surface of said casing.

10. A battery according to claim 9 wherein said first metal means includes the outer surface of said casing, wherein said second metal means is tubular in shape, wherein said ceramic means is circumferential in shape and wherein said casing includes an opening located concentrically around said tubular metal means, said ceramic means being positioned concentrically around said tubular metal means and filling said opening in said casing, the outer circumferential surface of said ceramic means being bonded to said casing around said opening and its inner circumferential surface being bonded to and around said tubular metal means.

11. A battery according to claim 10 wherein said casing includes a top cover and a bottom cover joined together to define said chamber, said top cover defining said opening and being bonded to said ceramic means.

12. A battery according to claim 11 wherein said top cover of said casing is between approximately 0.010 inch and 0.030 inch thick and wherein said annular ceramic means at its outer circumferential surface has an axial thickness of between approximately 0.030 inch and 0.050 inch.

13. A battery according to claim 11 wherein said top cover is about 0.010 inch thick and wherein said ceramic means has an axial thickness at its outer circumferential surface of about 0.030 inch.

14. A battery according to claim 10 wherein said top cover is about 0.020 inch thick and wherein said ceramic means has an axial thickness at its outer circumferential surface of about 0.040 inch.

15. A battery according to claim 11 wherein said top cover is about 0.030 inch thick and wherein said ceramic means has an axial thickness at its outer surface of about 0.050 inch.

16. A battery comprising:
   (a) a metal casing which acts as one external terminal of the battery and which defines an internal chamber, said casing including
      (i) a top cover defining an opening therethrough, and (ii) a bottom cover joined with said top cover to define said chamber;

(b) an elongated metal member extending through said opening and spaced from said casing such that one end section of said member is positioned within said chamber and such that an opposite end section is positioned within said chamber and such that an opposite end section is positioned outside said casing, said opposite end section acting as a second terminal of the battery;

(c) a circumferential ceramic insulation member having an outer circumferential surface and an inner circumferential surface and being located within and filling said opening in said top cover concentrically around said metal member for electrically insulating said top cover and metal member from one another, said outer surface being bonded to said top cover around said opening and said inner surface being bonded to and around said metal member;

(d) said casing, metal member and ceramic insulation member together maintaining said chamber in a hermetically sealed state so long as the pressure within said chamber is below a predetermined level;

(e) means for producing a voltage across said terminals, said means including
(i) a solid anode located within said chamber and connected to said one end portion of said metal member,
(ii) a solid cathode collector located within said chamber and spaced from said anode,
(iii) means for electrically insulating said anode and cathode collector from one another, and
(iv) a liquid cathode located within and filling said chamber, said liquid cathode being in direct contact with said anode, collector and the inner surface of said casing; and (f) means for automatically venting said internal compartment to a location outside said compartment in the event the pressure therein increases above said predetermined level, said venting means consisting essentially of said ceramic means, said ceramic means being constructed such that increasing pressure within said compartment will cause said ceramic means to crack a sufficient amount to vent said pressure before causing said bonds to fail.

17. A battery according to claim 16 wherein the top cover of said casing is between about 0.010 inch and 0.030 inch thick and wherein said ceramic insulation member at its outer circumferential surface has an axial thickness of between about 0.030 inch and 0.050 inch.

* * * * *